July 14, 1942.  J. H. VICTOR  2,289,607
OIL SEAL CONSTRUCTION
Filed July 16, 1941
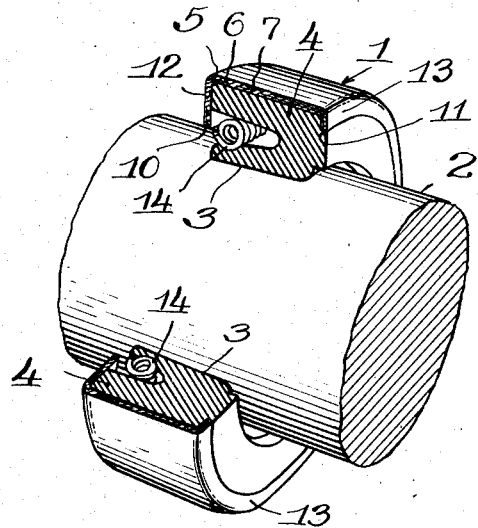
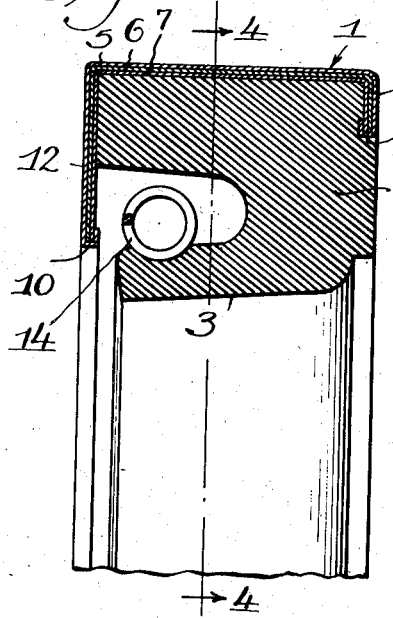
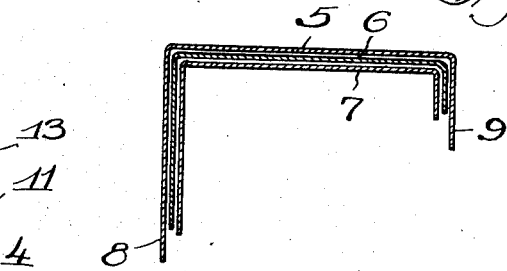
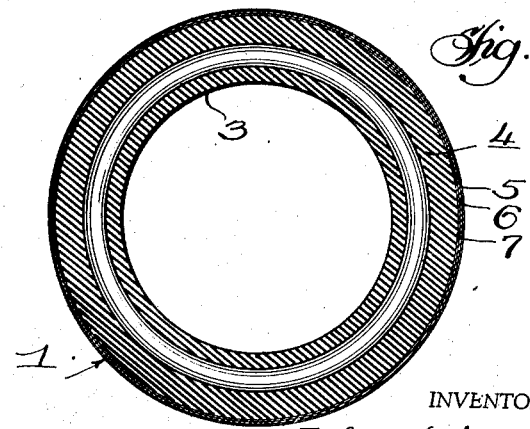
INVENTOR.
BY John H. Victor Patented July 14, 1942

2,289,607

UNITED STATES PATENT OFFICE 2,289,607

OIL SEAL CONSTRUCTION

John H. Victor, Wilmette, Ill., assignor to Victor Manufacturing & Gasket Company, Chicago, Ill., a corporation of Illinois Application July 16, 1941, Serial No. 402,682

2 Claims. (Cl. 288—3)

The present invention relates to an oil seal or grease retainer of the type adapted to effectively seal the opening or space between relatively rotatable parts such as a rotatable shaft and its surrounding housing or enclosure.

The present invention resides in the provision of a novel oil seal having a retaining shell formed of a plurality of relatively thin sheets or laminations of metal so constructed and arranged as to provide a retainer having rigidity yet sufficient inherent flexibility and yieldability so as to adjust itself to the contour and dimensions of the housing in which it is mounted when used as an internal type seal, or upon the shaft when used as an external type seal where the sealing contact is made with the interior of the surrounding housing.

It is another object of the present invention to provide a novel oil seal construction in which the retaining shell is of a laminated construction, with these laminations united in such manner as to form a unit assembly of substantially channel shape.

It is a still further object of the invention to provide an oil seal which may be made at an extremely low cost of sections of metal which are now being scrapped. This is of extreme importance due to the emergency conditions which make it difficult to secure the metals normally used in oil seal constructions. By means of the present novel invention it is possible to make use of the metals now available and which are considered as scrap or waste.

The invention further comprehends the provision of an armored, all plastic oil seal in which the sealing element is preferably composed of a plastic material such as synthetic rubber, the body of the sealing element substantially filling the interior of the retaining shell and retained therein in such manner as to prevent relative movement therebetween.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in perspective of the novel oil seal with a portion thereof broken away to more clearly show the interior construction.

Figure 2 is a fragmentary enlarged view in vertical cross section through the seal construction.

Figure 3 is a fragmentary view in vertical cross section through the laminations of the retaining shell, with the laminae separated sufficient to show their initial contour.

Figure 4 is a view in vertical cross section through the seal construction taken in a plane represented by the line 4—4 of Figure 2.

Referring more particularly to the disclosure in the drawing, the novel oil seal 1 is shown as having a rotative, wiping contact with a rotatable shaft 2, with the cylindrical external face of the sealing element adapted to be mounted in a surrounding housing. Although Figure 1 shows an internal type seal surrounding a rotatable shaft and having a wiping contact therewith, it is to be understood that the parts may be reversed in such a way that the retaining shell is mounted on the shaft 2 and the wiping lip 3 of the sealing element 4 has a sealing and wiping contact with a surrounding housing or enclosure.

The retaining shell for the sealing element 4 consists of a plurality of relatively thin and pliable sheets or strips of metal 5, 6 and 7, the latter two being preferably of similar contour and dimensions with their ends bent inwardly as more clearly shown in Figure 3. The outer lamina which may be of slightly heavier gauge metal than the inner two has its inwardly bent ends 8 and 9 of greater length than those in the sheets or strips 6 and 7 so that these ends may be bent over as at 10 and 11 to form a unit assembly and prevent leakage between adjacent laminae. As the sealing element is intended to be clamped between the ends 12 and 13 of the shell, the plastic sealing element 4 is placed therein and the ends spun, bent or otherwise forced inwardly to thereby anchor the sealing element in fixed position. In order to maintain the sealing lip 3 in rotative or wiping contact with the shaft 2, a contractile garter spring 14 is provided. To insure against any possible leakage between the contiguous or contacting surfaces of the shell and sealing element, an adhesive or sealing composition may be applied to either or both of such surfaces.

From the above description and the disclosure in the drawing, it will be apparent that the invention comprehends a novel oil seal having a retaining shell formed of thin and pliable laminations of metal.

Having thus disclosed the invention, I claim:

1. An oil seal comprising a flexible retaining shell consisting of a plurality of similar laminations of thin ductile metal in telescoped, contacting relation to form a channel-shaped member, the outer of said laminations having its side walls of greater length than those of the inner lamination and its ends bent inwardly and over the ends of the inner of said laminations to retain all of said laminations in interlocked, assembled relation and seal against leakage between the ends of adjacent laminations, and a flexible sealing element anchored within said shell and clamped between the opposite side walls of said member and having a body portion and an integral lip of synthetic rubber.

2. In an oil seal or grease retainer adapted to be mounted as an assembled unit in a housing about a rotatable shaft, a plurality of similar, relatively thin laminations of ductile metal each of similar channel shape and mounted in overlapping, nested relation to form a substantially channel-shaped and yieldable retaining shell, the outer lamination having its ends bent inwardly and over the ends of the inner of said laminations for sealing the ends of said laminations against leakage between adjacent laminae, and a flexible sealing element held under compression between the inner walls of and anchored within said shell and provided with a sealing lip in wiping contact with the shaft.

JOHN H. VICTOR.